(12) United States Patent
Gouhl et al.

(10) Patent No.: US 8,941,021 B2
(45) Date of Patent: Jan. 27, 2015

(54) WIRING DEVICE WITH COLOR CHANGE KIT

(71) Applicants: Erik Gouhl, Fayetteville, GA (US); Yogesh Vitthal Borkar, Peachtree City, GA (US); Robin Lu, Dongguan (CN); Rohit Sumerchand Dodal, Peachtree City, GA (US); Oscar Neundorfer, Senoia, GA (US); Jerry Zhang, Shanghai (CN)

(72) Inventors: Erik Gouhl, Fayetteville, GA (US); Yogesh Vitthal Borkar, Peachtree City, GA (US); Robin Lu, Dongguan (CN); Rohit Sumerchand Dodal, Peachtree City, GA (US); Oscar Neundorfer, Senoia, GA (US); Jerry Zhang, Shanghai (CN)

(73) Assignee: Cooper Technologies Company, Houston, TX (US)

(*) Notice: Subject to any disclaimer, the term of this patent is extended or adjusted under 35 U.S.C. 154(b) by 141 days.

(21) Appl. No.: 13/692,661

(22) Filed: Dec. 3, 2012

(65) Prior Publication Data
US 2014/0151203 A1 Jun. 5, 2014

(51) Int. Cl.
*H01H 9/02* (2006.01)
*H01H 11/00* (2006.01)

(52) U.S. Cl.
CPC .............. *H01H 9/02* (2013.01); *H01H 11/0006* (2013.01)
USPC ......................................................... 200/303

(58) Field of Classification Search
USPC ................. 200/303, 331, 339, 329, 252, 558; 174/66–67; 335/2, 202; 439/136, 140, 439/149, 536; 220/241–242; 29/402.08
See application file for complete search history.

(56) References Cited

U.S. PATENT DOCUMENTS

| | | | | |
|---|---|---|---|---|
| 5,900,584 | A * | 5/1999 | Cady et al. ....................... | 174/66 |
| 8,592,681 | B2 * | 11/2013 | Alderson et al. ................. | 174/66 |
| 2011/0259722 | A1 * | 10/2011 | Alderson et al. .............. | 200/339 |
| 2014/0138235 | A1 * | 5/2014 | Savicki et al. ................ | 200/558 |

* cited by examiner

*Primary Examiner* — Edwin A. Leon
(74) *Attorney, Agent, or Firm* — King & Spalding LLP

(57) ABSTRACT

The present disclosure provides a wiring device having a color change kit. The color change kit includes a removable skirt and switch cover. The skirt and switch cover, which are disposed on the wiring device and accessible by an end-user, are easily detachable from the wiring device. Thus, the skirt and the switch cover are replaced without replacing the entire wiring device. Further, the skirt and switch cover is replaced without removing the wiring device from a wall box or further disassembling the entire wiring device. In certain exemplary embodiments, the skirt is disposed within a housing of the wiring device, and the switch cover is disposed within the skirt.

18 Claims, 3 Drawing Sheets

WIRING DEVICE WITH COLOR CHANGE KIT

TECHNICAL FIELD

The present invention relates generally to electrical wiring devices and more particularly, to a wiring device with a color change kit.

BACKGROUND

Conventional wiring devices such as light switches include a housing with an upper surface which has an opening through which a toggle switch extends beyond, allowing a user to access the toggle switch to turn a load, such as a light, on and off. Generally, at least a portion of the upper surface of the housing and the toggle switch are visible to a user when a wall plate has been installed over the light switch. As such light switches may often be installed in the walls of homes, offices, classrooms, commercial facilities, etc., the exposed portion of the upper surface and toggle switch may also have an aesthetic aspect rather than being purely function. For example, it may generally be desirable for the exposed portions of the upper surface and the toggle switch to be of the same or a complementary color as the surrounding wall and/or wall plate. However, the upper surface and/or toggle switch may be manufactured as a permanent component of the wiring device. Thus, if a user desired to change the color of the exposed portions of the upper surface and toggle switch, the user may be forced to change out the entire light switch. Such a project may be costly and time consuming. Additionally, it may be challenging and costly for a distributor to keep inventory of wiring devices of various colors. Thus, if a customer is looking for a certain color that is not very common, it may be difficult or impossible for users to find a wiring device which has an upper surface and toggle switch of the desired color.

SUMMARY

An exemplary embodiment of the present invention includes a wiring device with color change kit. The wiring device with color change kit can include a housing, a switching device disposed in the housing, and a color change kit coupled to at least one of the switching device or the housing. The color change kit generally includes a switch cover and a skirt. The switch cover and the skirt are configured to be detachable from and attachable to the switching device.

Another exemplary embodiment of the present invention includes a wiring device color change kit. The wiring device color change kit can include a switch cover for a switching device, and a skirt for the switching device. The switch cover and skirt are configured to attach to and detach from the switching device without disassembling the switching device.

Another exemplary embodiment of the present invention includes a method of changing a switch cover and skirt. The method includes detaching a first skirt from at least one of a housing or a wiring device, detaching a first switch cover from the wiring device, attaching the first switch cover or a second switch cover to the wiring device, and attaching the first skirt or a second skirt to the housing of the wiring device. The first skirt and first switching cover are attachable to and detachable from the housing and wiring device without disassembling the housing or wiring device.

BRIEF DESCRIPTION OF THE DRAWINGS

The foregoing and other features and aspects of the invention are best understood with reference to the following description of certain exemplary embodiments, when read in conjunction with the accompanying drawings, wherein.

Figure 1:
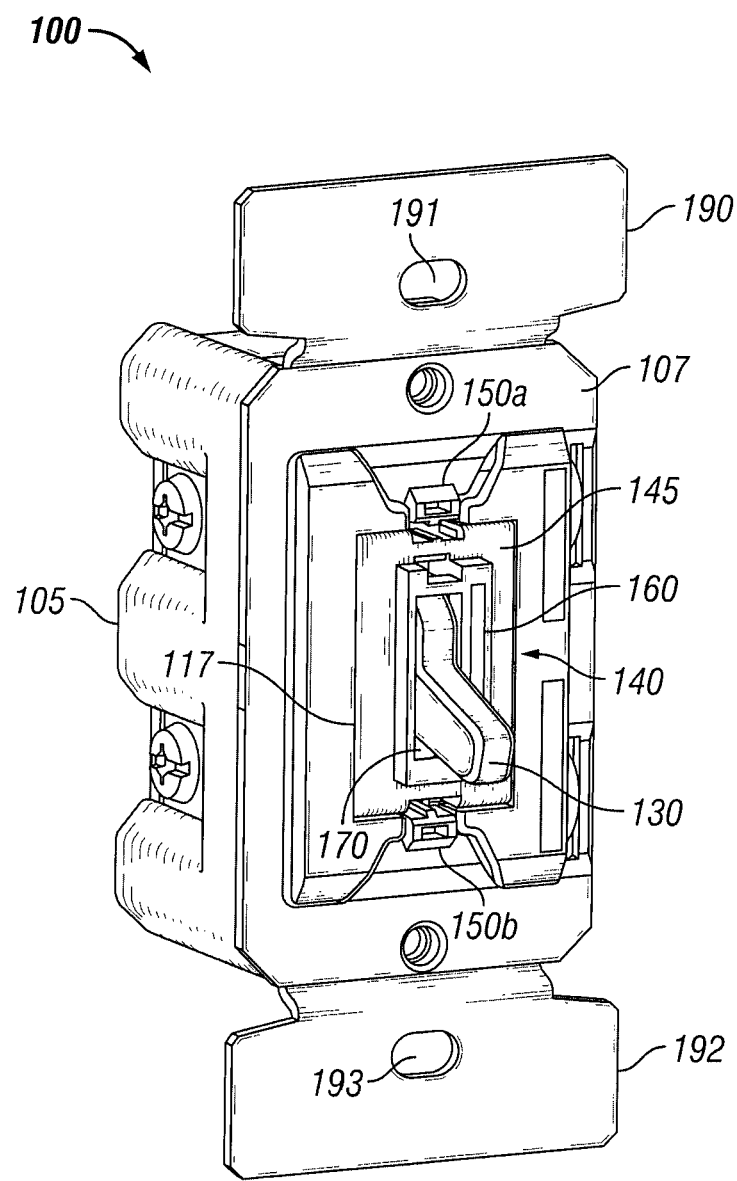
FIG. 1 is a perspective view of a toggle switch wiring device with color change kit in accordance with an exemplary embodiment of the present invention.

The drawings illustrate only exemplary embodiments of the invention and are therefore not to be considered limiting of its scope, as the invention may admit to other equally effective embodiments. The elements and features shown in the drawings are not necessarily to scale, emphasis instead being placed upon clearly illustrating the principles of the exemplary embodiments. Additionally, certain dimensions or positionings may be exaggerated to help visually convey such principles.

BRIEF DESCRIPTION OF EXEMPLARY EMBODIMENTS

The embodiments of the present invention are directed to wiring devices with a color change kit. Although the description of exemplary embodiments is provided below in conjunction with a toggle switch wiring device, alternate embodiments of the invention are applicable to other types of electrical wiring devices including, but not limited to, receptacle wiring devices, other electrical switches such as paddle switches and dimmer switches, and any other electrical wiring device. The invention is better understood by reading the following description of non-limiting, exemplary embodiments with reference to the attached drawings, wherein like parts of each of the figures are identified by like reference characters, and which are briefly described as follows.

The present disclosure presents a toggle switch wiring device 100 with color change kit 140 which allows a skirt 145 and a toggle cover 130 to be easily replaced to effect a color change of at least the visible portion of the toggle switch wiring device 100 when installed. This color change is effected without replacing the entire wiring device. To effect the color change, the skirt 145 and a toggle cover 130 disposed over the switch 385 are detached from the face, or top housing 107, of the toggle switch wiring device 100 and a different colored skirt and/or a different colored toggle cover 130 are reattached to the face of the toggle switch wiring device 100 with minimal effort. As such, distributors are able to satisfy the needs of customers by stocking various colored skirts 145 and toggle covers 130 rather than entire wiring devices of different colors. Stocking these replaceable skirts and switch covers are less costly and occupy less space than stocking entire wiring devices. Additionally, the toggle switch wiring device 100 with color change kit 140 allows end-users to easily replace the skirt 145 and/or the toggle cover 130 without having to remove the wiring device from the wall to which it is installed.

Figure 2:
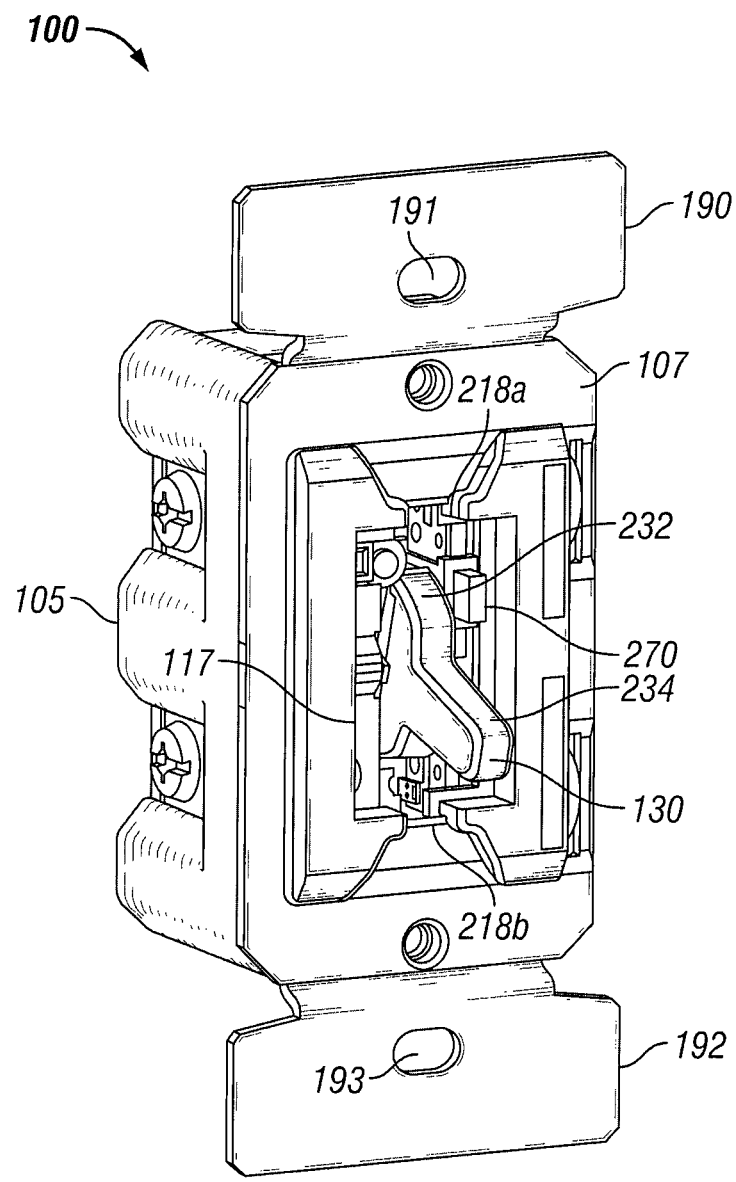
FIG. 2 is a perspective view of the toggle switch wiring device of FIG. 1 with a skirt of the color change kit removed, in accordance with an exemplary embodiment of the present invention.
Figure 3:
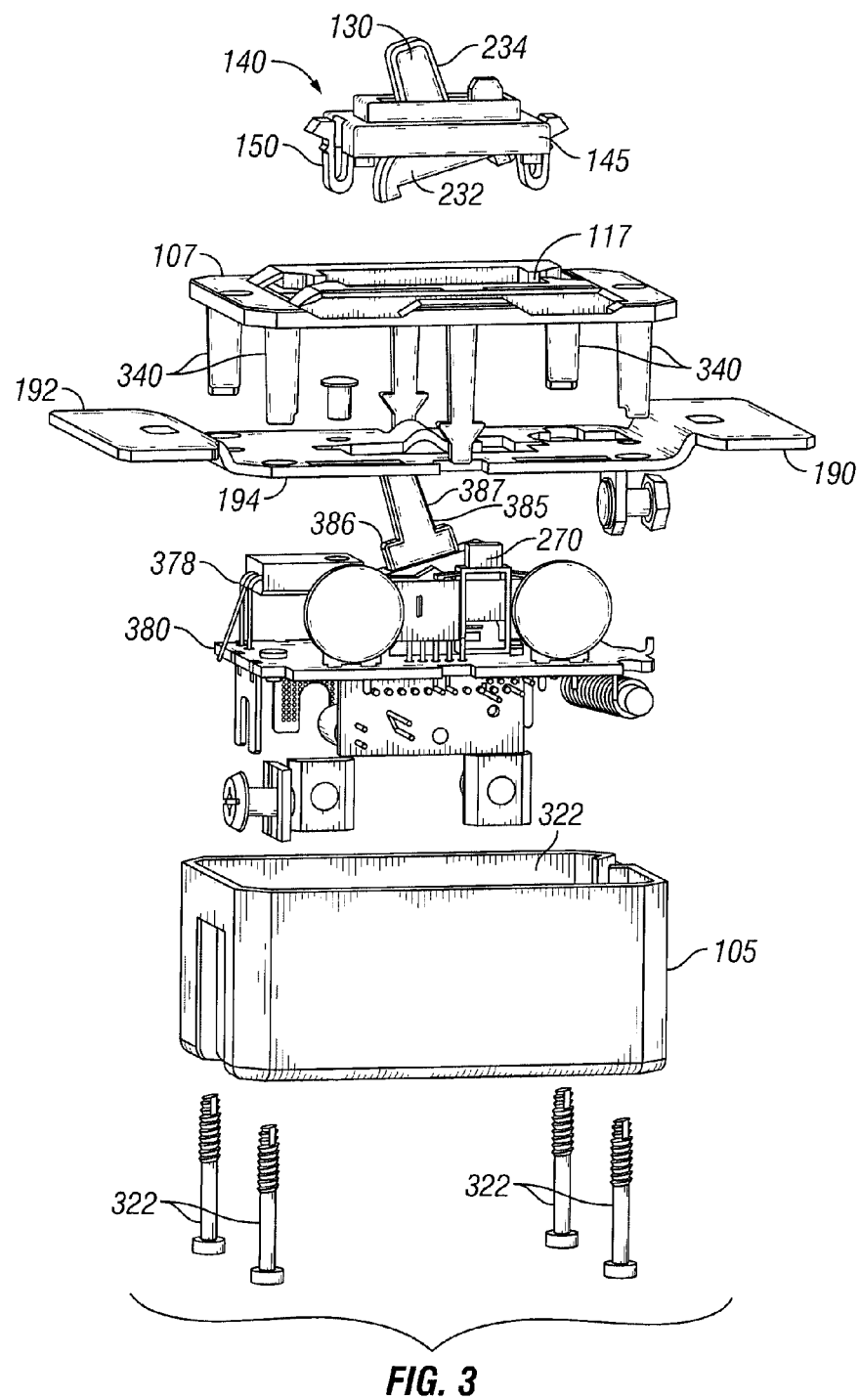
FIG. 3 is an exploded view of the toggle switch wiring device of FIG. 1 in accordance with an exemplary embodiment of the present invention.

FIG. 1 is a perspective view of a toggle switch wiring device 100 with a color change kit 140 in accordance with an exemplary embodiment of the present invention. FIG. 2 is a perspective view of the toggle switch wiring device 100 of FIG. 1 with the skirt 145 of the color change kit 140 removed, in accordance with an exemplary embodiment of the present invention. FIG. 3 is an exploded view of the toggle switch wiring device 100 of FIG. 1, in accordance with an exemplary embodiment of the present invention. Referring to FIGS. 1 and 3, the toggle switch wiring device 100 is substantially rectangularly shaped and includes an upper coupling band 190, a lower coupling band 192, a housing 105, one or more electrical components 378 disposed within the housing 105, a switch 385, a top housing 107, and the color change kit 140. The color change kit 140 includes at least one of the skirt 145 and the toggle cover 130. The toggle switch wiring device 100 also includes a dimmer slider 270, as shown in FIG. 2, according to certain exemplary embodiments. The one or more electrical components 378 is assembled as a PCB assembly 380, as shown in FIG. 3, which is disposed within the housing 105 according to some exemplary embodiments; however, one or more of the electrical components are assembled within the housing 105 in a different manner in other exemplary embodiments. The toggle switch wiring device 100 further includes one or more coupling devices 322, such as screws, that secure the PCB assembly 380 and other components, such as the top housing 107, to the housing 105. Although the toggle switch wiring device 100 is generally rectangular shaped, the toggle switch wiring device 100 is formed in different geometric or non-geometric shapes according to other exemplary embodiments.

The housing 105 is a substantially rectangularly shaped shell that includes an inner cavity 322 therein, but is capable of being formed in other geometric or non-geometric shapes if desired. In certain exemplary embodiments, the housing 105 houses certain electrical components, including the one or more electrical components 378 and/or PCB assembly 380, and electrical contacts, for electrically coupling the toggle switch wiring device 100 to building wires (not shown) and to load wires (not shown) that are electrically coupled to an associated load (not shown). However, in other exemplary embodiments, the electrical contacts are disposed adjacent to the housing 105. The housing 105 is dimensioned to fit within a wall box (not shown) according to some exemplary embodiments. The housing 105 includes one or more apertures (not shown) for receiving a respective coupling device 322, such as screws, therethrough in order to secure internal components such as the PCB assembly 380 within the housing 105 and some components to the housing 105. In certain exemplary embodiments, the housing 105 is fabricated using a plastic material. However, the housing 105 is fabricated using other suitable materials known to people having ordinary skill in the art in other exemplary embodiments.

The PCB assembly 380 is generally shaped to fit within the inner cavity 322 of the housing 105. The PCB assembly 380 includes various electronic components, conductors, contacts, and actuators, allowing the toggle switch wiring device 100 to carry out the functions of a light switch, light dimmer, or other wiring device functions, depending on the type of electrical wiring device used. In certain exemplary embodiments, the PCB assembly 380 electrically couples one or more load wires (not shown) to one or more building wires (not shown) via a switch 385, which is actuated by a user to energize and de-energize the associated load from the building wires, thereby turning the associated load on and off, respectively. In certain exemplary embodiments, and as illustrated in FIGS. 2 and 3, the PCB assembly 380 includes the dimmer slider 270 configured to adjust a variable output of the load. For example, the dimmer slider 270 is configured to adjust the intensity level of a light source when the load includes a light source according to certain exemplary embodiments. The dimmer slider 270 is slidably moveable, according to certain exemplary embodiments, into a range of positions corresponding to output intensity. For example, in certain exemplary embodiments, the load includes one or more light emitting elements. Therefore, the dimmer slider 270 adjusts the brightness of the light emitting elements depending upon the selected position of the dimmer slider 270. Generally, the switch 385 and the dimmer slider 270 extend outwardly away from and protrude outwardly from the housing 105 and top housing 107 when the PCB assembly 380 is disposed within the housing 105. In certain exemplary embodiments, the dimmer slider 270 includes a knob or the like which may be rotatively moveable to adjust the intensity of the output.

The upper coupling band 190 and the lower coupling band 192 are generally formed as a single component and coupled by a middle portion 194, as illustrated in FIG. 3. The upper and lower coupling bands 190, 192 are both partially disposed between the housing 105 and the top housing 107. However, in some exemplary embodiments, the upper coupling band 190 and the lower coupling band 192 are formed separately from one another. The upper coupling band 190 and the lower coupling band 192 extend lengthwise of the housing 105 and top housing 107 and collectively extend beyond the length of the housing 105 and top housing 107 in both directions. In certain embodiments, in which the upper coupling band 190 and the lower coupling band 192 are coupled by a middle portion 194, the middle portion 194 includes an opening through which the switch 385 and the dimmer slider 270 is to be disposed, allowing the switch 385 and the dimmer slider 270 to extend through and beyond the middle portion 194. The upper coupling band 190 includes an upper coupling band aperture 191 and the lower coupling band 192 includes a lower coupling band aperture 193. These apertures 191 and 193 are used to couple the wiring device 100 to the wall box using a screw (not shown) or other fastening device known to people having ordinary skill in the art. The upper coupling band 190 and the lower coupling band 192 is fabricated using a metal, such as steel, but is fabricated using other suitable materials known to people having ordinary skill in the art in other exemplary embodiments.

The top housing 107 is coupled to at least one of the upper coupling band 190, the lower coupling band 192, the middle portion 194, and the housing 105. The top housing 107 generally remains visible to an end-user once the wiring device 100 is installed within the wall box, before a cover (not shown) is installed according to certain exemplary embodiments. When the cover is installed, the top housing 107 is generally no longer visible to the end-user according to certain exemplary embodiments. The top housing 107 is substantially rectangularly shaped but is formed in other geometric or non-geometric shapes in other exemplary embodiments. In some exemplary embodiments, the top housing 107 has a profile that is substantially similar to the profile of the housing 105 and is disposed over the housing 105. The top housing 107 also includes one or more coupling elements 340 for coupling to the coupling devices 322, thereby securing the top housing 107 to the housing 105 and retaining the PCB assembly 380 and upper and lower coupling bands 190, 192. In certain embodiments, and as illustrated in FIG. 3, the coupling elements 340 includes threaded cavities (not shown) for receiving and securing to screws 322. The top housing 107 also includes an opening 117 through which the toggle cover 130 and skirt 145 are to be disposed and/or coupled. In the illustrated exemplary embodiment, the opening 117 is substantially rectangularly shaped and centrally located within the top housing 107. As further illustrated in FIG. 2, the top housing 107 also includes an upper receptacle 218*a* and a lower receptacle 218*b* adjacent to opposing sides of the opening 117. The receptacles 218*a* and 218*b* are configured to receive a coupling mechanism or the like of the skirt 145 and retain the skirt 145 in the opening 117. The top housing 107 may also be referred to as being a part of the housing 105, such that the housing 105 includes the top housing 107.

Referring again to FIGS. 1 and 3, in certain exemplary embodiments, the color change kit 100 includes the skirt 145. The skirt 145 is generally disposed within the opening 117 of the top housing 107. The skirt 145 is substantially rectangularly shaped and has a profile that is substantially similar to the profile of the opening 117 in the top housing 107. The skirt 145 further includes an upper coupling mechanism 150a and a lower coupling mechanism 150b on opposing sides of the skirt 145, at generally the same relative position to the skirt 145 as the receptacles 218a and 218b to the opening 117. Accordingly, when the skirt 145 is disposed over the opening 117 and pressed into the opening 117, the coupling mechanisms 150a and 150b are generally disposed within and coupled to the receptacles 218a and 218b, respectively. Generally, the coupling mechanisms 150a and 150b are disposed in and released from the receptacles 218a and 218b with little effort. For example, the coupling mechanisms 150a and 150b are moved or squeezed towards one another, thereby releasing the skirt 145 from within the opening 117. In certain embodiments, the coupling mechanisms 150 include snap-fit tabs, snaps, hooks, and the like. Accordingly, in certain embodiments, the receptacles 218a and 218b include coupling elements corresponding to the coupling mechanisms 150a and 150b, allowing the coupling mechanism 150a and 150b to couple to the receptacles 218a and 218b, respectively. For example, in certain embodiments, and as illustrated in FIGS. 1 and 3, the skirt 145 includes snap-fit tabs which allow the skirt 145 to be pushed into the opening 117 and secured therein by the snap-fit tabs. The skirt 145 is then also removed from the top housing 107 by squeezing the snap-fit tabs to release the skirt 145 from the top housing 107. Thus, the skirt 145 may be removed or replaced without disassembling other parts of the toggle switch wiring device 100 or replacing the entire toggle switch wiring device 100. In certain exemplary embodiments, the skirt 145 includes the receptacles 218a and 218b and the top housing 107 includes the coupling mechanisms 150a and 150b. The skirt 145 also includes a toggle opening 170 through which the toggle cover 130 is disposed therethrough, such that the toggle cover 130 is partially within the housing 105, disposed over the switch 385, and partially accessible by an end-user from outside of the housing 105 and top housing 107. The toggle opening 170 is rectangularly shaped and has a length capable of accommodating the different potential positions of the toggle cover 130. In certain exemplary embodiments, and as illustrated in FIG. 1, the skirt 145 further includes a dimmer slider slot 160 through which the dimmer slider 270 is disposed, such that the dimmer slider 270 is coupled to the PCB assembly 380 inside the housing 105 and also accessible by the end-user. The dimmer slot 160 is substantially rectangular or linear, and has a length capable of accommodating the range of potential positions of the slider 270.

Referring to FIGS. 1-3, the color change kit 140 includes the toggle cover 130. The toggle cover 130 is substantially shaped like the outer profile of the switch 385 and includes a cavity configured to have the switch 385 disposed therein. As shown in FIGS. 2 and 3, the toggle cover 130 includes a coupling portion 232 and an interface portion 234. The coupling portion 232 is disposed around a base portion 386 of the switch 385. The interface portion 234 is disposed around an interface portion 387 of the switch 385. The toggle cover 130 is partially disposed through the toggle opening 170 of the skirt 145 such that the interfacing portion 234 is exposed and accessible to the end-user while the base portion 232 is disposed within the top housing 107 and/or housing 105. The toggle cover 130, when disposed over the switch 385, moves the switch 385 in the same manner as the toggle cover 130 is moved by the end-user. As such, the toggle cover 130, along with the switch 385 is moved into one or more positions in the toggle opening 170 upon user manipulation, thereby energizing or de-energizing the associated load. In certain exemplary embodiments, the toggle cover 130 is removed or decoupled from the switch 385 and/or PCB assembly 380 when the skirt 145 is removed from the top housing 107 without disassembling other portions of the toggle switch wiring device 100. The toggle cover 130 is further replaced onto the switch 385 by being disposed or snapped onto the switch 385. In certain exemplary embodiments, the toggle cover 130 and the skirt 145 are formed as a single component or otherwise coupled to each other such that the toggle cover 130 is removed from the toggle switch wiring device 100 when the skirt 145 is removed the toggle switch wiring device 100 and installed onto the toggle switch wiring device 100 when the skirt 145 is installed onto the toggle switch wiring device 100.

It should be noted that in certain exemplary embodiments, the wiring device 100 includes a paddle switch (not shown) and a paddle cover (not shown). The paddle switch includes a top portion and a bottom portion forming an obtuse angle therebetween, which may be depressed by a user to turn a load on and off. In such embodiments, the paddle cover includes a cavity formed therein for receiving the paddle switch. Accordingly, the paddle cover is disposed over the paddle switch in a similar manner as the toggle cover 130 and switch 385 discussed above. Hence, the paddle cover is generally a similar shape compared to the paddle switch according to some exemplary embodiments. The paddle cover includes a first portion and a second portion, which are disposed over corresponding top and bottom portions of the paddle switch, respectively. Thus, the user may manipulate the paddle switch via the paddle cover.

As discussed above, the skirt 145 and the toggle cover 130 are detachable to and reattachable from the toggle switch wiring device 100 without further disassembling the toggle switch wiring device 100. A general method of changing the skirt 145 and/or toggle cover 130 includes detaching the skirt 145 from the top housing 107 and then detaching the toggle cover 130 from the switch 385. In certain embodiments, in order to detach the skirt 145 from the top housing 107, the dimmer slider 270 should be moved to a first position, or an upper position, in which the first position allows the skirt 145 to be removed from the top housing 107. Accordingly, the dimmer slider 270 may "lock in" the skirt 145 when the dimmer slider 270 is not in the first position. In certain embodiments, in which the skirt 145 includes coupling mechanisms 150 such as snap-fit tabs 150, a user may squeeze the snap-fit tabs 150 in order to release the skirt 145 from the top housing 107. In order to replace the skirt 145 and toggle cover 130, the toggle cover 130 is first replaced onto the switch 385. Then the skirt 145 is disposed into the opening 117 of the top housing 107 and around the toggle cover 130 according to certain exemplary embodiments. In certain exemplary embodiments, the skirt 145 is replaced first, followed by the toggle cover 130. In certain exemplary embodiments, the dimmer slider 270 is moved to a second position, or a bottom position, to lock the skirt 145 and/or toggle cover 130 in place once the skirt 145 and/or toggle cover 130 are installed.

In certain exemplary embodiments, the skirt 145 and/or toggle cover 130 of the toggle switch wiring device 100 is replaced to provide a skirt 145 and/or toggle cover 130 of a different color. As such, the entire toggle switch wiring device 100 does not need to be replaced in order to replace the toggle cover 130 and skirt 145. This flexibility allows for distributors to hold less inventory, to reduce cost for customers, and to provide flexibility with design and selection as the skirts 145 and the toggle covers 130 are fabricated in a variety of colors at relatively low cost and may be used with a single toggle switch wiring device 100. Additionally, the toggle switch wiring device 100 having the color change kit 140 also allows skirts 145 and/or toggle covers 130 to be easily replaced when they've become old due to use without replacing or disassembling the entire wiring device. For example, as the primary user contact points, the skirt 145 and/or toggle cover 130 may become dirty, worn, or otherwise undesirable over time. The wiring device 100 allows the skirt 145 and toggle cover 130 to be easily and economically replaced with a new skirt 145 and toggle cover 130 without replacing or disassembling the entire wiring device 100.

Although each exemplary embodiment has been described in detail, it is to be construed that any features and modifications that are applicable to one embodiment are also applicable to the other embodiments. Furthermore, although the invention has been described with reference to specific embodiments, these descriptions are not meant to be construed in a limiting sense. Various modifications of the disclosed embodiments, as well as alternative embodiments of the invention will become apparent to persons of ordinary skill in the art upon reference to the description of the exemplary embodiments. It should be appreciated by those of ordinary skill in the art that the conception and the specific embodiments disclosed may be readily utilized as a basis for modifying or designing other structures or methods for carrying out the same purposes of the invention. It should also be realized by those of ordinary skill in the art that such equivalent constructions do not depart from the spirit and scope of the invention as set forth in the appended claims. It is therefore, contemplated that the claims will cover any such modifications or embodiments that fall within the scope of the invention.

What is claimed is:

1. A wiring device, comprising:
a housing forming a cavity therein;
a switching device comprising a switch and a dimmer slider, at least a portion of the switch and at least a portion of the dimmer slider disposed within the cavity; and
a color change kit comprising a switch cover and a skirt, the switch cover being replaceably disposed over the switch and the skirt being replaceably coupled to at least a portion of the housing and surrounding at least a portion of the switch cover, wherein the skirt comprises an opening through which the switch cover is partially disposed and a slot through which a dimmer slider extends, and wherein the skirt is removable from the housing when the dimmer slider is in a first position.

2. The wiring device of claim 1, wherein the switch cover and the skirt are configured to be detachable from and attachable to the switching device without disassembling the housing.

3. The wiring device of claim 1, wherein the switching device comprises a toggle switch, and the switch cover comprises a toggle switch cover.

4. The wiring device of claim 1, wherein the switching device comprises a paddle switch, and the switch cover comprises a paddle switch cover.

5. The wiring device of claim 1, wherein the housing includes an opening formed in the housing, the skirt being disposed within the opening and replaceably coupled to the housing via a snap-fit coupling mechanism.

6. The wiring device of claim 5, wherein the skirt is detachable from the switching device by releasing the snap-fit coupling mechanism.

7. The wiring device of claim 1, wherein the skirt is coupled to or decoupled from the housing when the dimmer slider is in a first position.

8. A wiring device color change kit, comprising:
a switch cover capable of being replaceably disposed over a switch of a wiring device; and
a skirt capable of being replaceably coupled to at least a portion of a housing of the wiring device and surrounding at least a portion of the switch cover when installed onto the wiring device, the skirt having a slot formed therein configured to receive a dimmer slider extending therethrough;
wherein the switch cover is configured to extend through an opening formed within the skirt when installed onto the wiring device, and wherein the skirt is removable from the housing when the dimmer slider is in a first position.

9. The wiring device color change kit of claim 8, wherein the skirt is disposed within an opening formed in the housing, the skirt having an outer perimeter corresponding to the perimeter of the opening.

10. The wiring device color change kit of claim 8, wherein the switch cover includes a base portion configured to be disposed over a bottom portion of the switch and an interfacing portion configured to be disposed over a top portion of the switch,
wherein the interfacing portion extending through the opening formed within the skirt, and
wherein the switch cover is capable of being moved into one or more positions within the opening formed in the skirt, the switch cover moving the switch in a similar manner.

11. The wiring device color change kit of claim 8, where the switch cover and the skirt are fabricated from at least one polymer material.

12. The wiring device color change kit of claim 9, wherein the skirt comprises a first mating feature for coupling to the housing.

13. The wiring device color change kit of claim 12, wherein the housing comprises a second mating feature adjacent to the opening formed within the housing for mating with the first mating feature of the skirt, wherein the skirt is configured to replaceably couple to the housing via the first and second mating features.

14. The wiring device color change kit of claim 8, wherein the skirt comprises a raised portion, the raised portion surrounding the opening formed within the skirt.

15. The wiring device color change kit of claim 8, wherein the switch cover comprises a first portion and a second portion configured to be disposed over a top portion of the switch and a bottom portion of the switch, respectively, wherein the first portion and the second portion are adjacently formed at an angle between 180 degrees and 135 degrees.

16. A method of operating a color change kit of a wiring device, comprising:
moving a dimmer slider to a first position;
detaching a first skirt from a housing of a wiring device after moving the dimmer slider to the first position;
detaching a first switch cover from the wiring device after moving the dimmer slider to the first position;
attaching the first switch cover or a second switch cover to the wiring device; and attaching the first skirt or a second skirt to the housing of the wiring device, wherein the first skirt and first switching cover are attachable to and detachable from the housing and wiring device without disassembling the housing or wiring device.

17. The method of claim 16, further comprising:

releasing a coupling mechanism to detach the first skirt from the housing of the wiring device.

18. The method of claim 16, wherein the first and second switch covers are configured to be disposed over a switch in the wiring device.

* * * * *